July 18, 1939.   A. R. LOCKE   2,166,635
AUTOMOTIVE AIR CONDITIONING SYSTEM
Filed Nov. 1, 1935   2 Sheets-Sheet 1
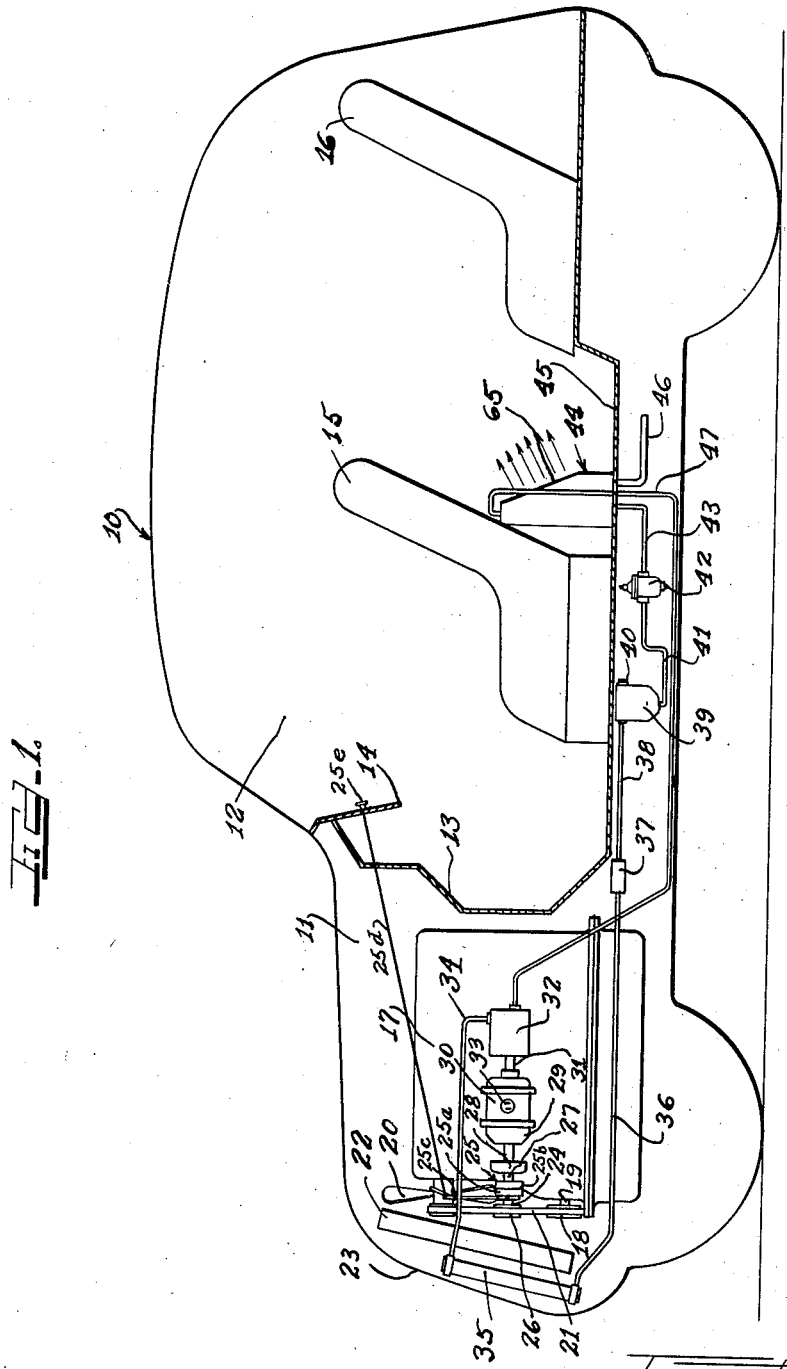
Inventor
Albert R. Locke
by Charles A. Hills Attys.

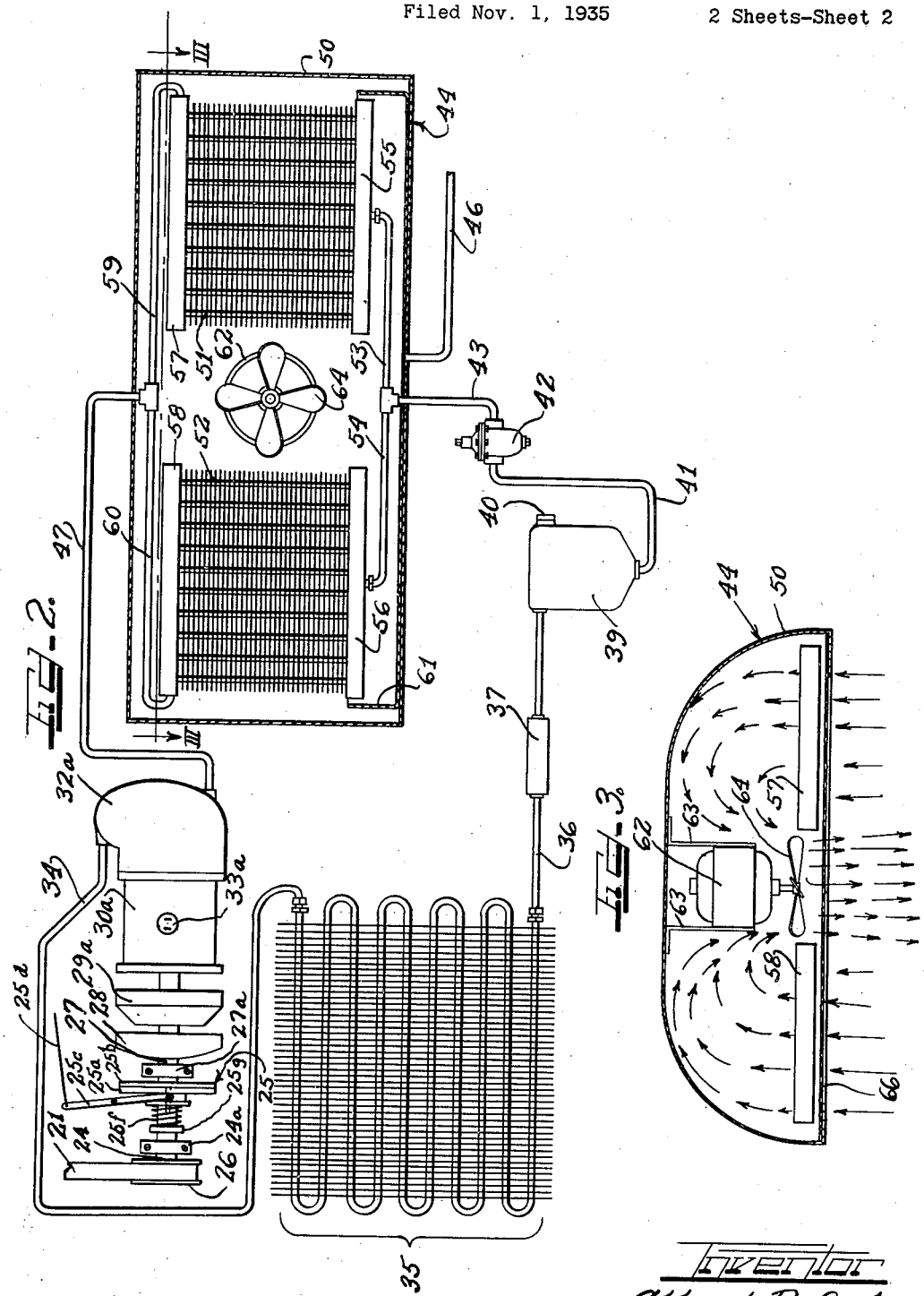

Patented July 18, 1939

2,166,635

UNITED STATES PATENT OFFICE 2,166,635

AUTOMOTIVE AIR CONDITIONING SYSTEM

Albert R. Locke, Oak Park, Ill., assignor to Houde Engineering Corporation, Buffalo, N. Y., a corporation of New York Application November 1, 1935, Serial No. 47,776

2 Claims. (Cl. 62—117)

This invention relates to an apparatus and method for conditioning the air of automotive vehicles, and more specifically to apparatus for cooling the storage space or occupied area of an automobile by means of power supplied by the automobile engine.

It is an object of this invention to provide apparatus which can be readily mounted on standard makes of automobiles and driven by the motor of an automobile to condition the air in the body of the automobile.

A further object of this invention is to provide an air conditioning system for automobiles.

Another object of this invention is to provide apparatus which can be mounted on closed types of self-propelled vehicles and driven by the motors of such vehicles for cooling the storage or passenger compartment of the vehicles.

A specific object of this invention is the provision of an air conditioning system of the expanded refrigerant type for automobiles.

Another object of this invention is to cool the passenger compartment of automotive vehicles by power supplied from the motors of such vehicles.

Other and further objects will be apparent from the following detailed description of the annexed sheets of drawings which disclose a preferred embodiment of the invention.

On the drawings:

Figure 1 is a diagrammatic side elevational view of apparatus according to this invention mounted in a sedan or coach type of automotive vehicle.

Figure 2 is an enlarged diagrammatic view of the air conditioning system, showing the evaporator unit thereof in vertical cross-section.

Figure 3 is a horizontal cross-sectional view of the evaporator unit shown in Figure 2, taken substantially along the line III—III of Figure 2.

As shown on the drawings:

In Figure 1, the reference numeral 10 indicates generally an automotive vehicle having a motor compartment 11 and a passenger compartment 12 separated therefrom by the partition wall 13 mounted behind the usual dashboard 14. Front and rear seats 15 and 16 are provided in the passenger compartment 12.

The motor compartment 11 contains a motor 17, such as an internal combustion engine, having the usual pulley 18 mounted on the end of the crankshaft 19 for driving a fan 20 through a belt connection 21. A radiator 22 is mounted in front of the motor 17, as is customary in automotive vehicles, and is covered with the usual grille indicated generally at 23.

In accordance with this invention, a shaft 24 is rotatably mounted alongside the motor 17, as will be more fully described in connection with Figure 2, and has a clutch indicated generally at 25 at one end thereof and a pulley 26 at the other end thereof. The pulley 26 is driven by the fan belt 21 to rotate the shaft 24 and drive the clutch 25. The clutch 25 can be any standard disk or cone clutch having a disk or plate 25a driven by the shaft 24 and a disk or plate 25b driven by the plate 25a by frictional contact therewith.

The plate 25a may be slided along the shaft 24 out of contact with the plate 25b by the usual clutch disengaging lever 25c, to disengage the clutch 25. The lever 25c may be operated through a Bowden wire 25d from the dashboard 14 of the vehicle. A conventional locking knob or handle 25e may be provided on the dashboard 14 to hold the wire 25d so that the clutch may be maintained in disengaged position if desired. The clutch plate 25b is secured to the end of a shaft 27 also rotatably mounted alongside of the motor 17, as will be more fully described, and drives a standard type of centrifugal throw-out clutch 28, which clutch 28 in turn drives an overrunning clutch 29 encased in the housing of an electric motor 30. The weights (not shown) on the centrifugal throw-out clutch 28 are set so that the clutch will disengage when the shaft 27 is driven beyond a predetermined speed.

The overrunning clutch 29 drives the armature of an electric motor 30, and this armature is connected by a shaft 31 to a vacuum pump or compressor 32. The pump 32 can therefore be driven directly from the motor 17 by the usual fan belt 21 thereof and will be maintained at a speed below a desired maximum by the centrifugal throw-out clutch 28. In the event it is desired to drive the pump 32 when the motor 17 is not running, the electric motor 30 may be energized by plugging in a source of electrical current in the plug 33 to drive the motor 30. This source of electrical current can be supplied from ordinary household current in the garage in which the vehicle is stored or can be supplied from the battery of the vehicle for pre-cooling the car. When the motor 30 is driven, the mechanism ahead of the motor is stationary because the overrunning clutch 29 will now run free and will not rotate the shaft 27.

Compressed refrigerant from the pump 32 is pumped through a tube 34 into a condenser 35 mounted between the grille 23 and the radiator 22. Air passing through the grille 23 also passes through the condenser 35 to cool the coils thereof and condense the compressed refrigerant flowing therethrough. The condensed refrigerant is drained from the condenser 35 through a pipe or tube 36 communicating with a dehydrator 37 for removing moisture from the refrigerant. The dehydrator contains any suitable moisture absorbing agent, such as aluminum oxide or the like. The dehydrated condensed refrigerant flows from the dehydrator 37 through a tube 38 into a receiver 39 where it is collected for use. The receiver 39 can be filled with a new charge of refrigerant by removing a plug 40 provided in the top thereof. The plug 40 can also be removed to purge the system free from air. From the receiver 39 the condensed refrigerant flows through a tube 41 into an expansion valve 42 where it is expanded and then flows through a tube 43 into an evaporator unit, indicated generally at 44, for cooling the coils therein.

The evaporator unit can conveniently be mounted behind the front seat 15 on the floor 45 of the automotive vehicle. As will be hereinafter described, air is propelled over the cooling coils in the evaporator unit 44 and is blown outwardly to circulate around the passenger compartment 12 of the car and lower the temperature therein. Any moisture condensed on the cooling coils in the evaporator unit 44 is drained through a pipe 46 extending beneath the floor 45 of the vehicle. The pump 32 sucks the expanded refrigerant from the evaporator unit 44 through a tube 47 back to the pump where it is again compressed and recirculated through the condenser and back into the receiver 39.

As a refrigerant, I prefer to use a non-inflammable, non-corrosive and non-explosive material which can be condensed into liquid form at temperatures obtainable by passing air around a condenser mounted in front of the radiator of an automotive vehicle and expanded into a gaseous form under reduced pressures readily obtainable by a rotary pump. It is also important that the refrigerant have a comparatively low freezing point. I have found that methylene chloride ($CH_2Cl_2$) possesses all of these properties and is available commercially under the name of "Carrene".

In Figure 2, the refrigerating system is shown in an enlarged diagrammatic view having some alternative forms of elements therein. As shown, the fan belt 21 drives the pulley 26 for rotating the shaft 24. The shaft 24 is rotatably mounted in a bearing 24a which can be secured to the block of the motor 17. As shown in Figure 2, the shaft 24 has a plate 25a of a clutch 25 slidably keyed on the end thereof and urged against a driven plate 25b of the clutch 25 by a coiled spring 25f held under compression between the slidable plate 25a and a collar 25g secured on the shaft 24. The disengaging lever 25c, as described above, can be pulled by the wire 25d to slide the plate 25a against the spring to disengage the clutch 25.

The driven plate 25b of the clutch 25 rotates the shaft 27 when the clutch is engaged to drive the centrifugal throw-out clutch 28. The shaft 27 is rotatably mounted in a bearing 27a carried by the motor 17.

Also, in Figure 2, there is shown an alternative arrangement in which the overrunning clutch 29a is mounted separately from the electric motor 30a, and the electric motor 30a instead is directly connected to the compressor pump 32a. The electric motor 30a has the plug 33a therein for attachment to a source of electrical current.

The details of the evaporator unit 44 which, as described in connection with Figure 1, is mounted on the floor of the automotive vehicle, is more fully shown in Figures 2 and 3. As shown, the evaporator unit 44 comprises a housing, such as a metal box 50, having mounted therein two sets of cooling coils 51 and 52, respectively. Refrigerant from the expansion valve 42 flows through the tube 43 into branch tubes 53 and 54 communicating with the lower headers 55 and 56 of the cooling coils 51 and 52, respectively. The refrigerant is distributed in the headers 55 and 56 to the cooling coils 51 and 52 and expands upwardly in the cooling coils into top headers 57 and 58, from which it is exhausted through branch pipes 59 and 60 into the suction line 47 of the compressor 32a.

A moisture collecting pan or trough 61 is mounted on the bottom of the housing 50 beneath the cooling coils for collecting any moisture condensed thereon from the air circulated around the cooling coils. The collected moisture is drained from the pan 61 through the tube 46, as explained in connection with Figure 1.

An electric motor 62 is mounted in the central portion of the housing on brackets 63, as shown in Figure 3. The motor 62 drives a fan 64. The sloping face 65 (Figure 1) of the evaporator unit 44 is open and has a grille or screen 66 (Figure 3) extending thereacross. As shown by the arrows in Figure 3, air from the passenger compartment 12 is circulated around the cooling coils 51 and 52 and cooled by these coils. The cooled air is then propelled by the fan 64 out of the housing 50 and circulated throughout the passenger compartment of the vehicle. The fan 64 therefore draws air from the vehicle around the cooling coils 51 and 52 and circulates this air back into the occupied area of the vehicle. The motor 62 for the fan 64 can conveniently be driven directly from the battery of the automotive vehicle.

From the above description, it should be understood that I have provided a simplified air conditioning system for self-propelled vehicles that is energized by the motor of such vehicles. The operation of the system is manually controlled by the driver of the vehicle from a dashboard control.

I am aware that many changes may be made and numerous details of construction may be varied through a wide range without departing from the principles of this invention, and I, therefore do not purpose limiting the patent granted hereon otherwise than is necessitated by the prior art.

I claim as my invention:

1. In combination with an automotive vehicle having a closed passenger compartment, a dashboard therein, a motor compartment having a motor therein and a belt driven fan on said motor, mechanism for operating apparatus for cooling the passenger compartment comprising a shaft rotatably mounted alongside of said motor in said motor compartment, a pulley secured to said shaft for engaging the fan belt of the motor to rotate the shaft, a disconnecting clutch carried by said shaft, a Bowden wire extending from said clutch through the dashboard permitting manual operation of the clutch from the dashboard, a centrifugal throw-out clutch driven by said disconnecting clutch, and a rotary compressor driven within a predetermined speed range by said centrifugal clutch.

2. Mechanism for driving a refrigerant compressor from an automobile motor in an automobile comprising bearings mounted on the motor, a shaft rotatable in said bearings, a pulley on the end of said shaft for engaging the fan belt of the motor to rotate the shaft, a plate clutch on said shaft, a centrifugal throw-out clutch driven by said plate clutch, a rotary compressor driven by said centrifugal clutch for compressing refrigerant and a Bowden wire operable from the dashboard of the automobile permitting manual disengaging of the plate clutch when it is desired to drive the motor without rotating the pump.

ALBERT R. LOCKE.